United States Patent
Roskind

(10) Patent No.: US 10,944,683 B1
(45) Date of Patent: Mar. 9, 2021

(54) HYBRID QUEUE SYSTEM FOR REQUEST THROTTLING

(71) Applicant: Amazon Technologies, Inc., Seattle, WA (US)

(72) Inventor: James Roskind, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 15/605,775

(22) Filed: May 25, 2017

(51) Int. Cl.
*H04L 12/873* (2013.01)
*H04L 12/825* (2013.01)
*H04L 12/851* (2013.01)

(52) U.S. Cl.
CPC ........ *H04L 47/522* (2013.01); *H04L 47/2425* (2013.01); *H04L 47/25* (2013.01)

(58) Field of Classification Search
CPC ... H04L 47/522; H04L 47/2425; H04L 47/25; G06F 3/061; G06F 5/06; G06F 3/0674; G06F 3/0656; G06F 9/3806; G06F 9/3804
USPC ................................................. 370/232, 230
See application file for complete search history.

(56) References Cited

U.S. PATENT DOCUMENTS

| | | | | |
|---|---|---|---|---|
| 4,942,569 A | * | 7/1990 | Maeno | H04L 47/10 370/230 |
| 5,742,606 A | * | 4/1998 | Iliadis | H04L 47/10 370/230 |
| 5,892,979 A | * | 4/1999 | Shiraki | G06F 5/06 710/52 |
| 5,893,924 A | | 4/1999 | Vakkalagadda | |
| 6,401,147 B1 | * | 6/2002 | Sang | H04L 47/24 710/14 |
| 6,487,212 B1 | * | 11/2002 | Erimli | G06F 5/06 370/230 |
| 6,823,351 B1 | | 11/2004 | Flood et al. | |
| 6,870,854 B1 | * | 3/2005 | Aimoto | H04L 12/5602 370/230 |
| 7,114,156 B2 | * | 9/2006 | Le | G06F 9/5038 709/242 |
| 7,180,888 B1 | * | 2/2007 | Crouch | H04L 12/6418 370/270 |
| 7,631,132 B1 | * | 12/2009 | Neuman | G06F 9/544 370/230 |

(Continued)

*Primary Examiner* — Jeffrey M Rutkowski
*Assistant Examiner* — Sudesh M Patidar
(74) *Attorney, Agent, or Firm* — Robert C. Kowert; Kowert, Hood, Munyon, Rankin & Goetzel, P.C.

(57) ABSTRACT

Systems and related methods are disclosed to store and throttle requests received by a service provider. In embodiments, the system includes two queues, a first-in-first-out (FIFO) queue and an overflow queue. An incoming request is stored in the overflow queue when there is no room in the FIFO queue. The overflow queue stores the requests in some priority order, which determines the order that the requests are promoted onto the FIFO queue and throttled. The FIFO queue may be sized according to a response time requirement provided in a service level agreement (SLA). In some embodiments, the FIFO queue may dynamically adjust its size based on the expected processing time or abandon duration of incoming requests. The hybrid approach allows a system to handle requests in simple FIFO order in normal circumstances, and in a more sophisticated priority order when the system is overloaded.

20 Claims, 10 Drawing Sheets

(56) References Cited

U.S. PATENT DOCUMENTS

| | | | | |
|---|---|---|---|---|
| 8,411,844 B1* | 4/2013 | Anisimov | H04M 3/5158 |
| | | | 379/265.01 |
| 8,462,632 B1* | 6/2013 | Vincent | H04L 47/25 |
| | | | 370/235 |
| 9,521,178 B1* | 12/2016 | Gigliotti | H04L 65/602 |
| 2007/0058536 A1* | 3/2007 | Vaananen | H04L 47/10 |
| | | | 370/230 |
| 2015/0172169 A1* | 6/2015 | DeCusatis | H04L 45/14 |
| | | | 718/1 |
| 2016/0132331 A1* | 5/2016 | Godard | G06F 9/3806 |
| | | | 711/137 |
| 2016/0299697 A1* | 10/2016 | Chen | G06F 3/0611 |
| 2018/0183724 A1* | 6/2018 | Callard | H04L 41/08 |

* cited by examiner

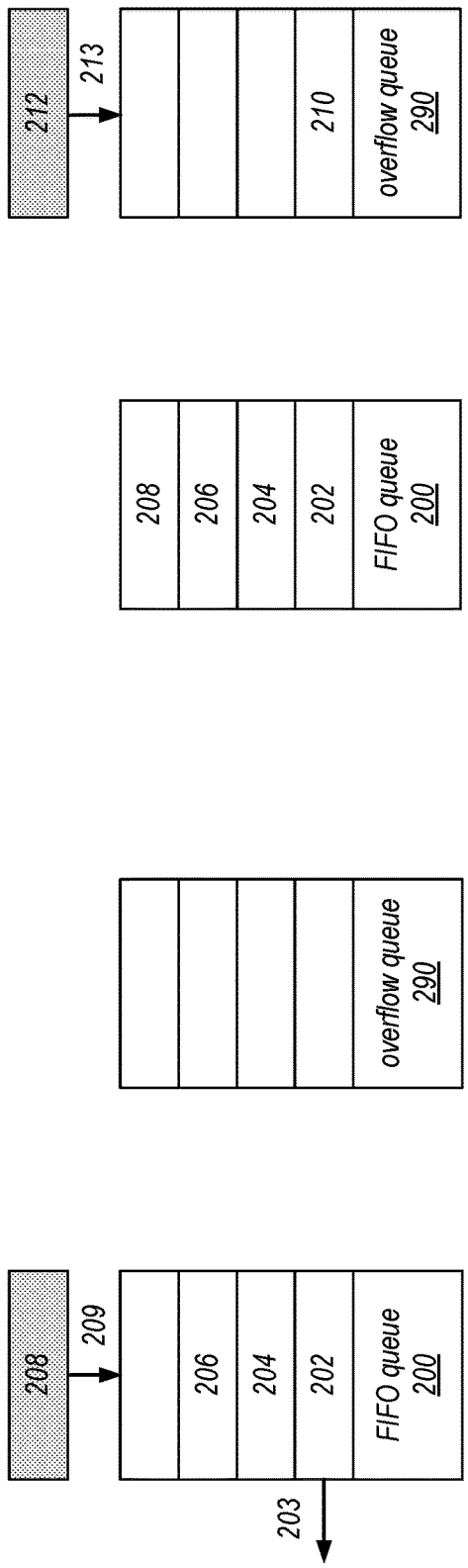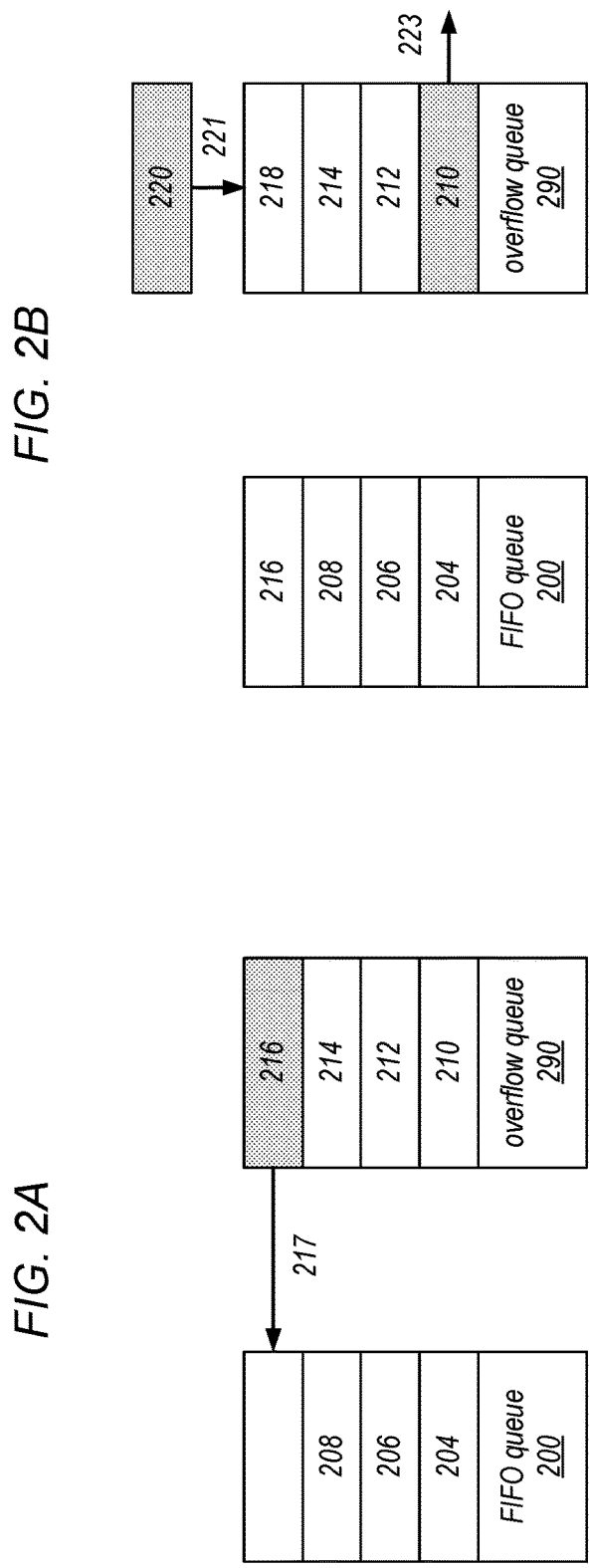
FIG. 2A
FIG. 2B
FIG. 2C
FIG. 2D

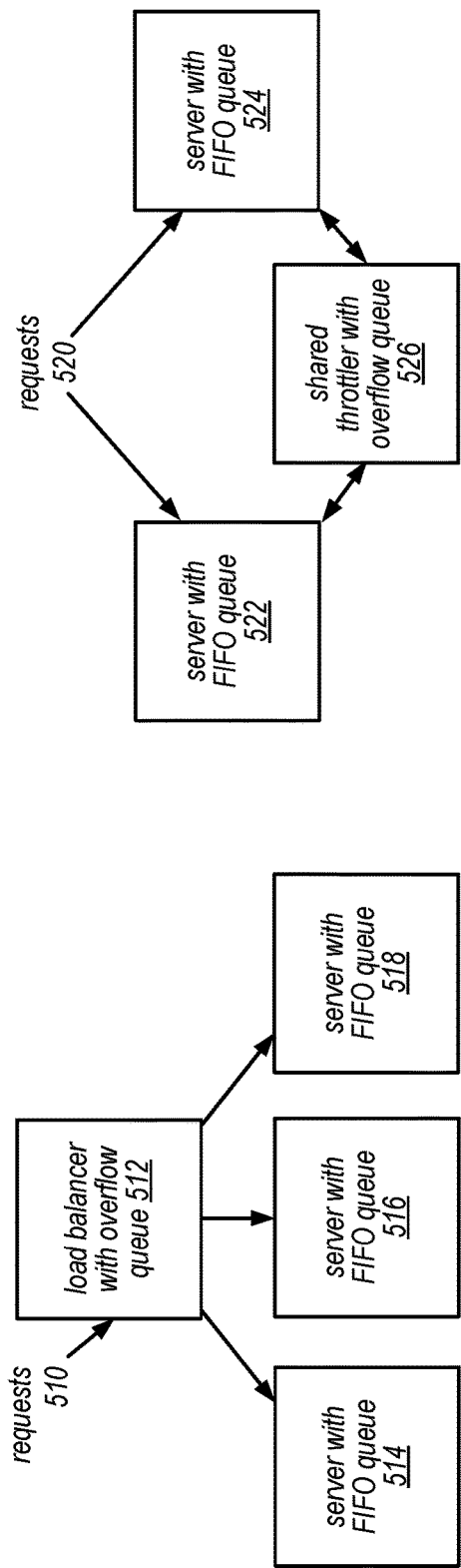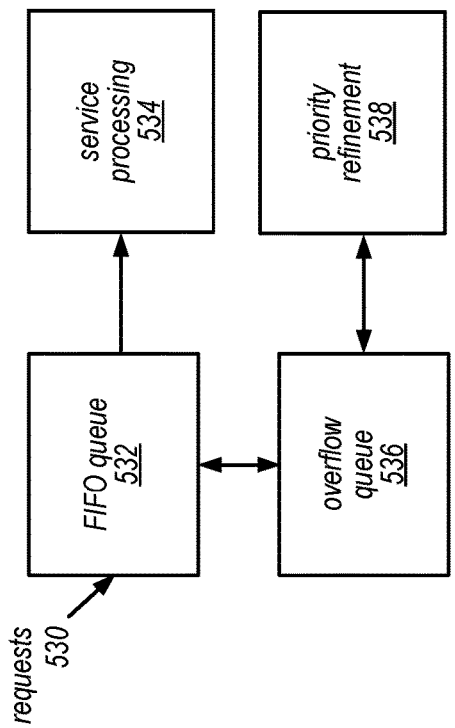

SERVICE REQUEST QUEUE CONFIGURATION 600

PRIMARY QUEUE DEPTH 610:

○ ___ REQUESTS

○ EXPECTED NUMBER OF REQUESTS THAT CAN BE PROCESSED WITHIN __80__ MILLISECONDS
(DEFAULT TO 80% OF SERVICE LEVEL AGREEMENT RESPONSE TIME)

● DYNAMICALLY ADJUST QUEUE DEPTH BASED ON 615:

☒ EXPECTED REQUEST PROCESSING TIME

☒ __110__ % OF EXPECTED REQUEST ABANDON TIME

☒ USE OVERFLOW QUEUE 620:

SORT REQUESTS BY: [ ADD MORE 622 ]

REQUEST AGE (ASCENDING), THEN
EXPECTED REQUEST PROCESSING TIME (DESCENDING), THEN
RANDOM

THROTTLE CRITERIA: [ ADD MORE 624 ]

LOWEST REQUEST WHEN QUEUE IS FULL, OR
ANY REQUEST WITH AGE > 10 MILLISECONDS

HYBRID QUEUE SYSTEM FOR REQUEST THROTTLING

BACKGROUND

A system that provides services to clients may implement some mechanism to protect itself from a crushing load of service requests that could potentially overload the system. For example, for a web-based service or remote procedure call (RPC) service, the service provider system is considered to be in an "overloaded" state if it is not able to provide an expected quality of service for some portion of client requests it receives. One solution employed by service provider systems to deal with request overload is to deny service (a.k.a., to throttle) a certain proportion of incoming client requests until the system recovers from the overloaded state.

Large service provider systems that serve many clients generally use first-in-first-out (FIFO) request queues to store pending requests to the system. When the rate of arrival of requests exceeds the rate at which tasks are serviced, the request queue can grow, delaying processing of the later tasks. When delay grows large enough, a "spiral of death" (i.e., congestion collapse) may ensue. In a common scenario, clients experiencing a high latency from the service may suspect that their requests were lost, and resubmit their requests, thereby further increasing the size of the request queue and causing further delay, which in turn generates more resubmissions of requests. During this process, a server may attempt to service an old task, only to find that the requester is no longer waiting for the response. One way to escape such a spiral of death is to discard (i.e., throttle) a large number of pending requests while servicing some of the remaining requests, until the resubmissions gradually subside, and the underlying request rate becomes manageable.

However, the task of selecting which requests to throttle in such a system remains a complicated problem. Under normal circumstances, the system's FIFO queue ensures a "first come first serve" order of servicing of requests, which is simple and fair. However, the FIFO ordering may not be optimal in a spiral of death situation. In that state, a better approach may be to prioritize newer requests, as they may constitute resubmissions of the older requests in the queue. In some cases, a large percentage of the older requests may have already been abandoned by their clients. The implementation of a single prioritization scheme that can work well in both situations represents a significant challenge.

BRIEF DESCRIPTION OF THE DRAWINGS

FIGS. 2A-2D illustrate various states in an example computer system that employs a hybrid queuing system to store and throttle requests to a service provider, according to some embodiments.

FIGS. 5A-5C are block diagrams illustrating example implementations of hybrid queuing systems to store and throttle requests, according to some embodiments.

FIG. 6 illustrates an example user interface that can be used to configure a hybrid queuing system to store and throttle requests, according to some embodiments.

Figure 1:
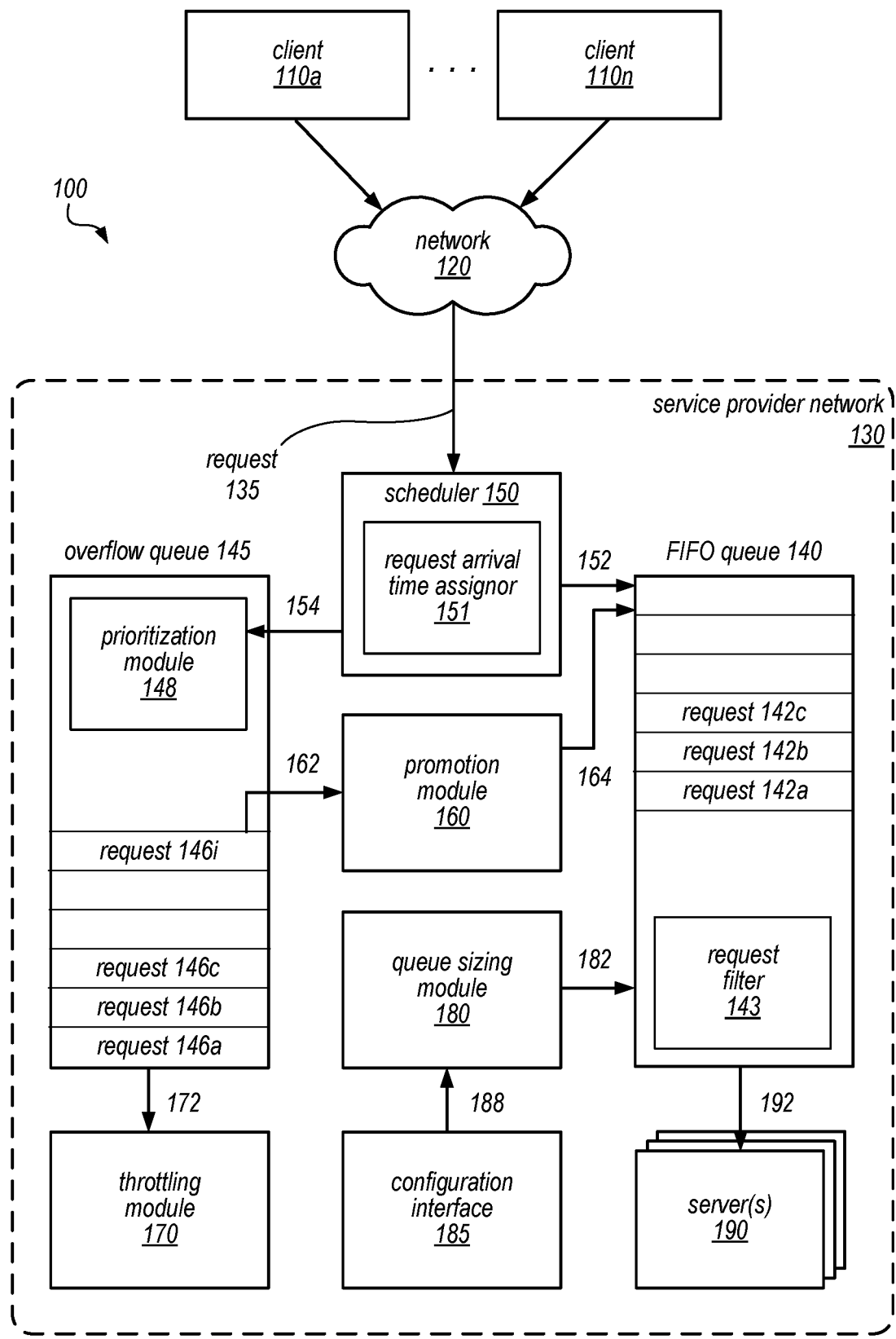
FIG. 1 is a block diagram illustrating an example computer system that employs a hybrid queuing system to store and throttle requests to a service provider, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments implement a hybrid request queuing system to store and throttle requests directed to a service provider system. The hybrid queuing system to automatically detect and differentially respond to congestion problems experienced in the service provider system, and throttle some requests, while allowing the service provider system to remain in a stable state to productively service requests.

Large service provider systems that serve many clients generally use first-in-first-out (FIFO) request queues to store pending requests to the system. When the rate of arrival of requests exceeds the rate at which tasks are serviced, the request queue can grow, delaying processing of the later tasks. When delay grows large enough, a "spiral of death" (i.e., congestion collapse) may ensue. In a common scenario, clients experiencing a high latency from the service may suspect that their requests were lost, and resubmit their requests, thereby further increasing the size of the request queue and causing further delay, which in turn generates more resubmissions of requests. During this process, a server may attempt to service an old task, only to find that the requester is no longer waiting for the response. Such activities waste the server's time and results in the starvation of newer, live requests of waiting clients. One way to escape such a spiral of death is to discard (i.e., throttle) a large number of pending requests, and try to get back to a state where productive work (processing recent tasks) is again achieved.

However, the task of selecting which requests to throttle in such a system remains a complicated problem. Under normal circumstances, the system's FIFO queue ensures a "first come first serve" order of servicing of requests, which is simple and fair. However, the FIFO ordering may not be optimal in a spiral of death situation. In that state, a better approach may be to prioritize newer requests, as they may constitute resubmissions of the older requests in the queue. In some cases, a large percentage of the older requests may have already been abandoned by their clients. The implementation of a single prioritization scheme that can work well in both situations represents a significant challenge. It would be advantageous for the request queueing system to automatically detect a congestion problem, and then differentially respond to such congestion problems, to throttle some requests while servicing others, so as to quickly return to a stable state.

Accordingly, in some embodiments disclosed herein, a hybrid request queuing system in constructed from two queues: a primary FIFO queue and a secondary overflow queue. The primary FIFO queue of restricted size, and may be fed sequentially by the secondary overflow queue, which may be a priority queue maintaining a priority ordering over its stored requests. The FIFO queue may be sized based on the terms of the service level agreement (SLA) associated with the requested service. For example, the FIFO queue size may be a fraction, such as one half, of the quotient of the SLA divided by the expected average processing time for requests. The overflow queue may sort its tasks according to any sort order. For example, the overflow queue may prioritize a request based on the type of client (human or robot) that issued request. As another example, the overflow queue may use a request's receipt or arrival time to prioritize the request. In some cases, the overflow queue may rely on a pseudorandom number generated locally for the request to prioritize the request. These different attributes of the request may be used in combination to rank the request.

In some embodiments, the hybrid request queuing system may throttle low ranking requests from the overflow queue. Throttling may be performed by necessity when the overflow queue itself overflows, or by policy, for example to periodically remove certain requests from the queue according to a criterion. Conversely, as requests are removed from the FIFO queue for processing, top ranking requests in the overflow queue may be promoted into the FIFO queue. The promotion may be performed based on the same request attributes as the throttling. For example, a queuing system may throttle requests from the overflow queue with the earliest arrival time (oldest requests), and promote requests from the overflow queue with the latest arrival time (newest requests).

As can be appreciated by those skilled in the art, such a hybrid queuing system provides a number of benefits over traditional queuing systems that employ pseudorandom throttling. In traditional queuing systems, the prioritization scheme attempts to be fair to all the pending requests, thus resulting in a large queue that exceeds the requirements of the SLA. In the hybrid queuing systems, a prioritization scheme may be implemented in the overflow queue such that some types of requests may be starved. This prioritization scheme in the overflow queue does not come into play during normal conditions when the system is not overloaded, when the request queue behaves as a classic FIFO queue that is completely fair. However, when the system is overloaded and overflow occurs, the prioritization of the overflow queue may automatically throttle the needed percentage of excessive requests to allow the system to recover from the overloaded condition.

Moreover, in some embodiments, the size of the FIFO queue can be dynamically adjusted to adapt to execution conditions of the system. For example, the system may monitor data concerning incoming requests to determine the average processing time for requests and also the average time that it takes for a client to abandon a request. These findings may be used to dynamically adjust the size of the FIFO queue. For example, a shorter abandon time period or duration means that a larger percentage of pending requests may be unproductive. Accordingly, during an overloaded condition, the system may employ a smaller FIFO queue, so that requests that are pending longer than the abandon time period or duration will be pushed to the overflow queue, where they are subject to an alternate prioritization, potentially leading to throttling. Thus, by adjusting the depth of the FIFO queue, the system may adjust how aggressively pending requests are throttled. These and other features and benefits of the hybrid queuing system are described in further detail below, with reference to the figures.

FIG. 1 is a block diagram illustrating an example computer system that employs a hybrid queuing system to store and throttle requests to a service provider, according to some embodiments. As illustrated, the computer system 100 may include one or more clients 110a to 110n, which may communicate over a network 120 with a service provider network 130. The service provider network 130 may provide computing resources via one or more computing services to the clients 110 over network 120.

The service provider network 130 may be operated by an entity to provide one or more services, such as various types of cloud-based computing or storage services, accessible via the Internet and/or other networks to clients 110. In some embodiments, the service provider network 130 may implement a web server, for example hosting an e-commerce website. Service provider network 130 may include numerous data centers hosting various resource pools, such as collections of physical and/or virtualized computer servers, storage devices, networking equipment and the like, needed to implement and distribute the infrastructure and services offered by the service provider network 130. In some embodiments, service provider network 130 may provide computing resources to clients. These computing resources may in some embodiments be offered to clients 110 in units called "instances," such as virtual compute instances.

Virtual compute instances are one example of virtual computing resources. The virtual computing resources may be hosted on a virtualization host. A virtualization host may be one or more physical computing devices. The physical computing devices are an example of physical computing resources. A virtualization host may include a virtualization management module capable of instantiating and managing a number of different client-accessible virtual computing resources. The virtualization management module may include, for example, a hypervisor and an administrative instance of an operating system, which may be termed a "domain-zero" or "dom0" operating system in some implementations. The dom0 operating system may not be accessible by clients on whose behalf the virtual computing resources are run. The dom0 operating system may be responsible for various administrative or control-plane operations of the service provider, including for example capturing usage and performance metrics data from the virtual computing resources and the physical computing resources.

The clients 110 may encompass any type of client configurable to submit requests to the service provider network 130. For example, a given client 110 may include a suitable version of a web browser, or may include a plug-in module or other type of code module configured to execute as an extension to or within an execution environment provided by a web browser. Alternatively, a client 110 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 110 may be configured to generate network-based services requests according to a Representational State Transfer (REST)-style network-based services architecture, a document- or message-based network-based services architecture, or another suitable network-based services architecture. In some embodiments, the service provider network 130 may offer its services as web services, and the clients 110 may invoke the web services via published interfaces for the web services. In some embodiments, a client 110 (e.g., a computational client) may be configured to provide access to a computing service 130 in a manner that is transparent to applications implemented on the client 110 utilizing computational resources provided by the service provider network 130.

The clients 110 may convey network-based services requests to the service provider 130 via network 120. In various embodiments, network 120 may encompass any suitable combination of networking hardware and protocols necessary to establish network-based communications between clients 110 and service provider network 130. For example, a network 120 may generally encompass the various telecommunications networks and service providers that collectively implement the Internet. A network 120 may also include private networks such as local area networks (LANs) or wide area networks (WANs) as well as public or private wireless networks. For example, both a client 110 and the service provider network 130 may be respectively provisioned within enterprises having their own internal networks. In such embodiments, the network 120 may include the hardware (e.g., modems, routers, switches, load balancers, proxy servers, etc.) and software (e.g., protocol stacks, accounting software, firewall/security software, etc.) necessary to establish a networking link between the client 110 and the Internet as well as between the Internet and service provider network 130. In some embodiments, clients 110 may communicate with service provider network 130 using a private network rather than the public Internet.

The services offered by the service provider network 130 may include a variety of types of services that allows clients 110 to use computing resources in the service provider network 130 for a variety of purposes. In some embodiments, the services may be RPC or web-based services. In some embodiments, the service provider network 130 may implement a web server that responds to web-based requests. For example, the service provider 130 may implement an e-commerce website that allows clients 110 to purchase goods and services from one or more e-commerce vendors. In some embodiments, the services may be part of a software-as-a-service (SaaS) platform, that provides a variety of traditional on-premises services from a remote data center in the cloud. The services can, for example, provide access to generic compute instances. The services can also provide access to specialized compute instances with specialized functionality, such as routers, domain name systems (DNSs), load balancers, desktop virtualization servers, and the like. The services may include various types of storage services that expose different types of storage access interfaces, including block-based storage services, relational database services, NoSQL database services, file system services, and the like. The services may also include services that provide functionalities of commonly used software modules, which can be used in conjunction with other software to implement larger systems. For example, the services may include queuing services, notification services, logging services, key storage and management services, and the like. The services may include services that implement larger systems with sophisticated functionality, such as machine learning, identity management, software development environments, multi-tenant containers for hosting software tenants, and the like. The services may be standard services provided by the service provider, or services implemented by third parties on top of the standard services. The services generally operate on computing resources of the service provider network 130, and may be controlled and configured by clients 110 via various interfaces such as graphical user interface (GUI) (e.g., as part of an administration control panel or web site) and/or as a programmatic interface such as an Application Programming Interface (API).

As shown, the service provider network 130 may implement two queues. The first queue may be a FIFO queue 140 that feeds pending requests 142a-c to one more servers 190 in the service provider network 130, which may be configured to service the requests. The second queue may be an overflow queue 145 that stores overflow requests 146a-i. In some embodiments, the FIFO queue may act as the primary request queue for the servers 190, allowing the servers to retrieve the pending requests in FIFO order, i.e., the order that the requests were received. The overflow queue may act as a secondary queue that is not used until the FIFO queue 140 is filled up. When the FIFO queue 140 is full, additional incoming requests, such as requests 146a-i, are stored in the overflow queue 145.

In some embodiments, the two queues 140 and 145 may act as two sequential queues. For example, a FIFO queue may be used to provide requests to be serviced as soon as they are removed from the FIFO queue, and an overflow queue may be used to provide requests for insertion into the FIFO queue when the FIFO queue has available space. As a more specific example, a FIFO queue may be used in conjunction with an overflow queue that feeds requests to the FIFO queue a last-in-first-out (LIFO) order. As a second specific example, a FIFO queue may be used in conjunction with an overflow queue that is a priority queue. For example, the order of extraction from the overflow queue may be based upon a priority attribute associated to each request when it is placed in the overflow queue.

In some embodiments, the service provider network 130 may implement a request scheduler 150, which performs the function of placing the incoming requests on one of the two queues. Thus, the request scheduler 150 may first check if the FIFO queue 150 has space for a new request. If so, the request scheduler 150 may enqueue 152 the new request to the FIFO queue 140. If not, the request scheduler 150 may enqueue 154 the new request to the overflow queue 145. In some embodiments, the request scheduler 150 may be implemented as a separate module from the two queues, or even on a different computing server from the two queues. For example, in some systems, the request scheduler 150 may be part of a gateway node, a request dispatching system, or a load balancer, that is responsible for initially receiving incoming requests. In some embodiments, however, the request scheduler 150 may be implemented as part of the FIFO queue 140. For example, in some systems, an enqueue operation to the FIFO queue 140 may automatically transfer the new request to the overflow queue 145, as needed. The passing of the request from the FIFO queue 140 to the overflow 145 may be completely hidden behind the API of the FIFO queue 140.

In some embodiments, the scheduler 150 or some other module in the service provider network 130 may implement a request arrival time assignor 151. The request arrival time assignor 151 may tag each incoming request with an official arrival time, which may be used as an attribute to prioritize the requests. The assignor may assign or determine the arrival times in a variety of ways. For example, in some embodiments, incoming TCP socket connections can be tracked by the service provider and tagged with the time of day. In that example, some or all of the complete data associated with that socket (e.g. arriving request), may be read by an application, and tagged with the time of day for its arrival. This time tag may be designated as the arrival time of a request. In some embodiments, a submission time may be included in a request specification. For example, a client may append a submission time to meta-information included in a request, such as in HTTP header information. In some embodiments, the service provider may estimate the arrival time using a provided submission time. For example, a server may estimate the arrival time by adding some amount of expected transmission latency to the submission time. As another example, a server may use the submission time as an estimate of the arrival time. In some embodiments, a server may adjust a submission time to account for clock skew between the client and the server.

In some embodiments, the overflow queue 145 may implement a prioritization module 148, which may assign priorities to incoming requests to the overflow queue 145. For example, the prioritization module 148 may be implemented using one or more servers that implement the enqueueing operation for the overflow queue 145. In some embodiments, the priority order of the requests may be used to determine top requests that are promoted to the FIFO queue when space is available. In some embodiments, the priority order may be used to determine bottom requests that may be throttled from the overflow queue.

The prioritization algorithm may include a number of variations, and may be configurable, depending on the situation. In some cases, the arrival time of the request may be used to determine the request's priority. For example, in an overload condition, older requests on the overflow queue may be throttled first, because in overload conditions, a large percentage of pending requests may be abandoned requests that have been superseded by retry attempts that are already in the queue. Servicing older requests under these conditions may prove to be unproductive.

In some embodiments, an estimate of the processing time of a request may be obtained, and that the expected processing time of the request may be used to determine the request's priority in the overflow queue. For example, the system configuration may be provided with an estimate of the average (or in some cases, minimum or maximum) processing time of some portion of past requests. In some embodiments, estimates of request processing time may be calculated based on the past processing times. For example, an exponentially weighted moving average of recent processing times may be used as an estimate of the average processing time. As another example, the largest processing time observed in a recent period of time, such as the last 5 minutes, may be used to estimate the expected minimum processing time. As a further example, an exponentially weighted moving average of such recent interval-based minima may be used to estimate the estimated minimum processing time. The overflow queue may prioritize the requests such that requests with the smallest expected processing times are promoted first, or throttled last, or both. This greedy approach allows the system to process a large number of small requests, given the load of the system.

In some embodiments, a request may be prioritized according to metadata information associated with the request, such as the source of the request. For example, in some embodiments, such information may indicate whether the request was a request issued by a human waiting for a real-time response, or an automated request issued by a computer system, which may be an internal or external system. In some embodiments, this context information may be deduced recursively. For example, one subsystem may receive a request with a given context, and then provides a sub-request to a second subsystem, and transitively establishes the context of the sub-request. In some embodiments, a function that establishes the prioritization for a request may incorporate random or pseudo-random data, or data from external sources, such as the time of day. For example, the function that assigns the priority for a request may do so pseudo-randomly. A pseudo-random attribute may be used as part of a priority determination process implemented by the prioritization module 148. In some embodiments, context information provided with a request may include a user identifier, such as a logged in user ID that initiated the request. In some embodiments, information provide with a task may include a session identifier, identifying a group of one or more transactions initiated by a user during a period of time, or from a specific location or client device. In some embodiments, information provided with a task may include a pseudo-random number, such as one transitively passed from request to subrequest.

A person of ordinary skill would understand that other attributes or factors may be used to prioritize the requests in the overflow queue 145, and that the prioritization may be based on multiple of these attributes or factors in combination. For example, the prioritization function employed by the prioritization module 148 may use one a series of attributes to sort the requests, each successive attribute in the series acting as an addition tiebreaker in the sort order. For example, a prioritization function may use the source of the request (human or robot, internal or external) as a first attribute, so as to assure that human requests are prioritized before computer system requests in the overflow queue. The prioritization function may then use the arrival time of the request, or the negative of the arrival time of the request, to prioritize later arriving requests before earlier ones. The prioritization function may then use a pseudo-random value generated by the service provider as a final tiebreaker.

Whether a request was initiated by a human or a robot may be determined using a variety of robot detection techniques. For example, the identities of certain web robots are published, for example in the robotstxt.org database. Under this system, each web robot may be associated with a public user agent string, and a web server may impose rules on such web robots by indicating the rules in a standard file (e.g., robots.txt) on the web server, which may or may not be followed. Such a file may include a directive for web robots to voluntarily identify themselves to the server in their requests, thereby distinguishing them from human initiated requests. As another example, in some embodiments, the service may implement a so-called "Completely Automated Public Turing test to tell Computers and Humans Apart," or CAPTCHA test. Such a test may request a user to recognize the contents of an image or sound that is difficult to be consistently deciphered by a computer. The service provider may initiate a client session with a client once the client passes the CAPTCHA test, and deem all subsequent client interactions in the session to be human interactions. As a more sophisticated example, a web server may generate webpages that embed client-side code, for example Javascript, that determines whether there is human activity associated with the web client. For example, in some embodiments, a webpage from the server may include a Javascript module to detect mouse interaction with the web browser. Once such human activities are detected, requests from that client may be deemed human requests. As may be appreciated by those skill in the art, there are many ways to distinguish human-initiated requests from machine or robot-generated requests. All of these techniques may be used to implement the inventive concepts disclosed herein.

As shown, the FIFO queue 140 may include requests 142a-c that are provided 192 to the servers 190 in the service provider network 130, so that the requests can be processed in FIFO order. Under normal load conditions, the number of pending requests may not overflow the FIFO queue, and so the system's request handling behavior may be the same as a simple FIFO request queue. In some embodiments, the FIFO queue may be implemented on the actual servers 190, in some cases implemented by the processing modules themselves. In some embodiments, the FIFO queue may provide an API that permits different request producers to poll the FIFO queue about its current capacity and to enqueue additional requests. In some embodiments, the API may be used by both the request scheduler 150 to enqueue newly received requests to the FIFO queue, and also the promotion module 160 to enqueue old requests from the overflow queue to the FIFO queue.

The service provider network may implement a promotion module 160 that promotes or transfers requests currently in the overflow queue 145 to the FIFO queue 140. In some embodiments, the promotion module 160 may poll the FIFO queue 140 to check if it current has sufficient space for additional requests. In some embodiments, the FIFO queue may alert the promotion module as soon as space opens up in the FIFO queue, for example when a top request such as request 142a is removed from the queue to be processed. The promotion module 160 may then select 162 one or more top requests, such as request 146i, from the overflow queue and add 164 the request to the FIFO queue. In some embodiments, the top requests from the overflow queue may be obtained via a simple dequeue operation, which provides the top-ranking request as prioritized by the prioritization module 160. In some embodiments, the prioritization module may use additional factors to select a request from the overflow queue, which may include the priority of the requests. In some embodiments, the promotion module 160 may select a top request from the overflow using the same prioritization as the throttling module 170, which uses the prioritization to throttle bottom ranking requests from the overflow queue.

In some embodiments, the FIFO queue 140 may be sized according to an SLA response time requirement associated with the service that the requests are directed to. For example, in some cases, the SLA may indicate a requirement or expectation of how long a request should take, from submission (arrival time) until completion of processing. For example, an SLA for a service may indicate that a submitter should expect a response (after complete processing of a task) in less than a fixed length of time, such as under 10 seconds, under 50 ms, etc. In some embodiments, the SLA may be externally specified, such as specified in a configuration file, or added to the configuration data store for the service.

In some embodiments, terms in the SLA may be deduced by a service, such as by noting that requests that are completely processed in excess of a certain length of time (after time of arrival), are often abandoned by the submitter. For example, a request arriving via a TCP connection, after being fully processed, may be met with an already RESET TCP connection when the processing result is available. In that case, the processing system may deduce that a de facto response time requirement that the response should be provided in less than the duration of time from the task arrival time to the point in time at which the RESET was detected. As another example, HTTP/2 uses a connection between a client and a server that relies on a single TCP connection to exchange multiple streams of messages, similar to the manner in which UDP is used to exchange multiple streams of messages in the Quick UDP Internet Connections (QUIC) protocol. Each stream uses efficient coding of HTTP header fields to reduce latency time. In such a system, a stream reset may indicate that a client has abandoned a request sent via that stream.

In some embodiments, the FIFO queue 140 may be of constrained size. For example, a FIFO queue 140 may be restricted to not exceed holding more than K requests. In some embodiments, the restricted size of the FIFO queue may be computed as a function of one or more terms of an SLA, such as an estimate of request processing time or a response time requirement. In some embodiments, the size of the FIFO queue 140 may be set to be a fraction, such as one-half, of the quotient of a maximum response time requirement divided by an estimate of request processing estimate, such as an average request processing time determined empirically from service data. For example, the SLA may specify a requirement that responses to service requests should be provided in 100 ms, and the expected processing time of each request is 1 ms. In this case, the size of the FIFO queue 140 may be restricted to a fraction (e.g., 50%) of 100 ms/1 ms, which results in a size of 50 requests for the FIFO queue. The size of the FIFO queue 140 represents a tip over point where the queueing system switches from a simple FIFO queue to a more sophisticated queue that employs a more sophisticated prioritization scheme to manage the tail end of the queue. Thus, when the number of requests grows to a certain point (e.g., 50%) of SLA requirement, the system may begin to place additional requests on the overflow queue, which in some embodiments exposes these additional requests to potential throttling.

In some embodiments, the size of the FIFO queue 140 may be determined or modified 182 by a queue sizing module 180. The queue sizing module 180 may determine the size of the FIFO queue initially, when the FIFO queue is first created. As discussed, this size may be based on one or more attributes determined from the SLA. In some embodiments, the size of the FIFO queue may stay fixed after the queue's creation. In some embodiments, the FIFO queue may change in size after its creation, based on empirical data obtained from the operation of the service. For example, as discussed, the expected processing time of requests may be used to adjust the depth of the FIFO queue 140. This adjustment may be performed by the queue sizing module 180, in some embodiments. In some embodiments, the FIFO queue 140 may continue to adjust its size up and down based on the performance of the service or the state of the queues. In some cases where the FIFO queue 140 shrinks and one or more requests 142 are pushed off of the FIFO queue, these requests may be demoted to the overflow queue 145, as if they are newly arriving requests that do not fit in the FIFO queue.

As shown, the service provider network may also include a configuration interface 185. The configuration interface 185 may be used to adjust 188 various control parameters of the queuing system, such as for example the size of the FIFO queue 140, or the conditions or frequency for which the FIFO queue 140 is to be resized. As another example, the configuration interface may also be used to adjust how requests are prioritized in the overflow queue 145, and how the requests are promoted or throttled.

In some embodiments, the service provider network 130 may implement a throttling module 170. The throttling module 170 may throttle 172 requests from the overflow queue 145, based on a throttling policy. In some cases, the throttling policy may simply reject the bottom ranked requests in the overflow queue, based on the prioritization produced by the prioritization module 148. As discussed, this prioritization may be the same prioritization used by the promotion module 148 to promote requests from the overflow queue to the FIFO queue.

Depending on the embodiment, the throttling module 170 may throttle the requests at different times. In some embodiments, the throttling may occur when the overflow queue 145 overflows, or when the overflow queue 145 reaches some percentage of full capacity. In some cases, the throttling may throttle at a relatively low rate when the overflow queue is at a low usage level, and throttle more aggressively when the overflow queue is at a higher usage level. In some embodiments, the throttling may occur periodically, and regular time intervals. For example, the throttler may from time to time examine the requests in the overflow queue, and throttle all requests that satisfy some throttling criteria. In some cases, the throttling criteria may be the priority rank of the requests.

In some embodiments, the throttling may be performed at the time a request is removed, for example via a promotion, from the overflow queue. In some embodiments, throttling may also be performed when a request is removed from the FIFO queue, by for example an optional request filter 143. For example, when a request is removed from the FIFO queue for processing, its total duration of time in the both queues (i.e., difference between current time and arrival time) may be determined. If the duration time on the overflow queue is greater than a threshold, then the request may be rejected or throttled. Thus, in some embodiments, throttling may occur from the FIFO queue, in some cases even when the system is not in an overloaded state. The criteria used by the request filter 143 may vary from embodiment to embodiment. By waiting until the last possible moment to throttle requests, the system can sometimes make better throttling decisions. For example, it may be determined at the last moment that a request that is about to be processed has been abandoned by the client, or that one or more related request have already been throttled. Based on this information, the request filter 143 may determine that it would be unproductive to service the dequeued request, and move on to the next request in the FIFO queue.

In some embodiments, when a request is present in a queue, and its total time in the queue(s) is greater than a threshold, the request may be rejected or throttled. In some embodiments, a threshold for rejection or throttle may be a function of an SLA, position in the queue, and an estimate of processing time for the task. For example, the rejection threshold may be a response time requirement or expectation specified in the SLA, reduced by the minimum expected processing time for the request. As another example, the threshold may be the SLA response time, reduced by the product of the expected processing time for the request times the number of queued items ahead of the request. Thus, in such examples, a negative result would indicate that the request in question would violate SLA time requirement, and that the request would likely be abandoned by the client. In some embodiments, a rejection or throttle may include discarding the request without any response or processing. In some embodiments, a rejection or throttle may include responding to client with a failure response, without further processing of the request.

FIGS. 2A-2D illustrate various states in an example computer system that employs a hybrid queuing system to store and throttle requests to a service provider, according to some embodiments. In FIGS. 2A-2D, a FIFO queue 200 and an overflow queue 290 are shown, which may be the FIFO queue 140 and overflow queue 145 shown in FIG. 1, respectively. The numbered items in the two queues represent currently queue requests, and the numeral shown for the item indicates the order in which the items are received by the system.

In FIG. 2A, the FIFO queue 200 has not yet overflowed. The FIFO queue 200 currently holds requests 202, 204, and 206. Since it is a FIFO queue, the oldest request 202 will be the next request to be removed 203 for processing. FIG. 2A also shows a new request 208, which is being added 209 to the FIFO queue.

In FIG. 2B, the FIFO queue 200 has overflowed. In this state, FIFO queue 200 is fully occupied by requests 202, 204, 206, and 208. Moreover, overflow queue 290 now stores an additional request 210 that could not fit on the FIFO queue. As discussed, the FIFO queue may be sized that when its capacity gets near a point where the requests are going fail an SLA response time requirement, the queuing system may stop adding to the FIFO queue. Under this somewhat overloaded condition, further incoming requests are diverted to the overflow queue, which may employ more sophisticated techniques to prioritize the requests, and possibly throttle some requests. This arrangement thus allows for an adaptation of the queuing system to potential system overload conditions. Also shown in FIG. 2B is another new request 212 to the system, which is added to the overflow queue 290, because the FIFO queue 200 is full.

In FIG. 2C, the FIFO queue 200 continues to overflow, and the overflow queue 290 now holds additional requests 214 and 216. However, a space has opened up on the FIFO queue, possibly due to the removal of request 202 for processing. In some embodiments, as soon as space becomes available on the FIFO queue, a request may be selected from the overflow queue 290 to fill the available space. In the shown example, request 216 is selected from the overflow queue, which may be selected according to the prioritization ordering of the overflow queue. Thus, in this example, the overflow queue is not in FIFO order. In some cases, the overflow queue may be prioritized, at least in part, in reverse FIFO order, or LIFO order. This ordering allows the overflow queue to deprioritize certain older requests, because they may be abandoned or superseded by new retry requests.

In FIG. 2D, both queues 200 and 290 are now full, and another new request 220 is received by the system. In this state, an enqueue 221 of the request 220 will overflow the overflow queue 290. In some embodiments, when an overflow of the overflow queue occurs, a bottom requests is selected and throttled by the system. In this case, the bottom request selected is request 210, which is throttled 223 from the overflow queue. The throttle selection may be based on the prioritization of the overflow queue, which may in some cases deprioritize older requests such as request 210, as discussed. Thus, after the throttle 223, the overflow queue will contain requests 212, 214, 218, and 220, with the newest request 220 being the high ranked request to be next promoted, and the oldest request 212 being the lowest ranked request to be next throttled.

Figure 3:
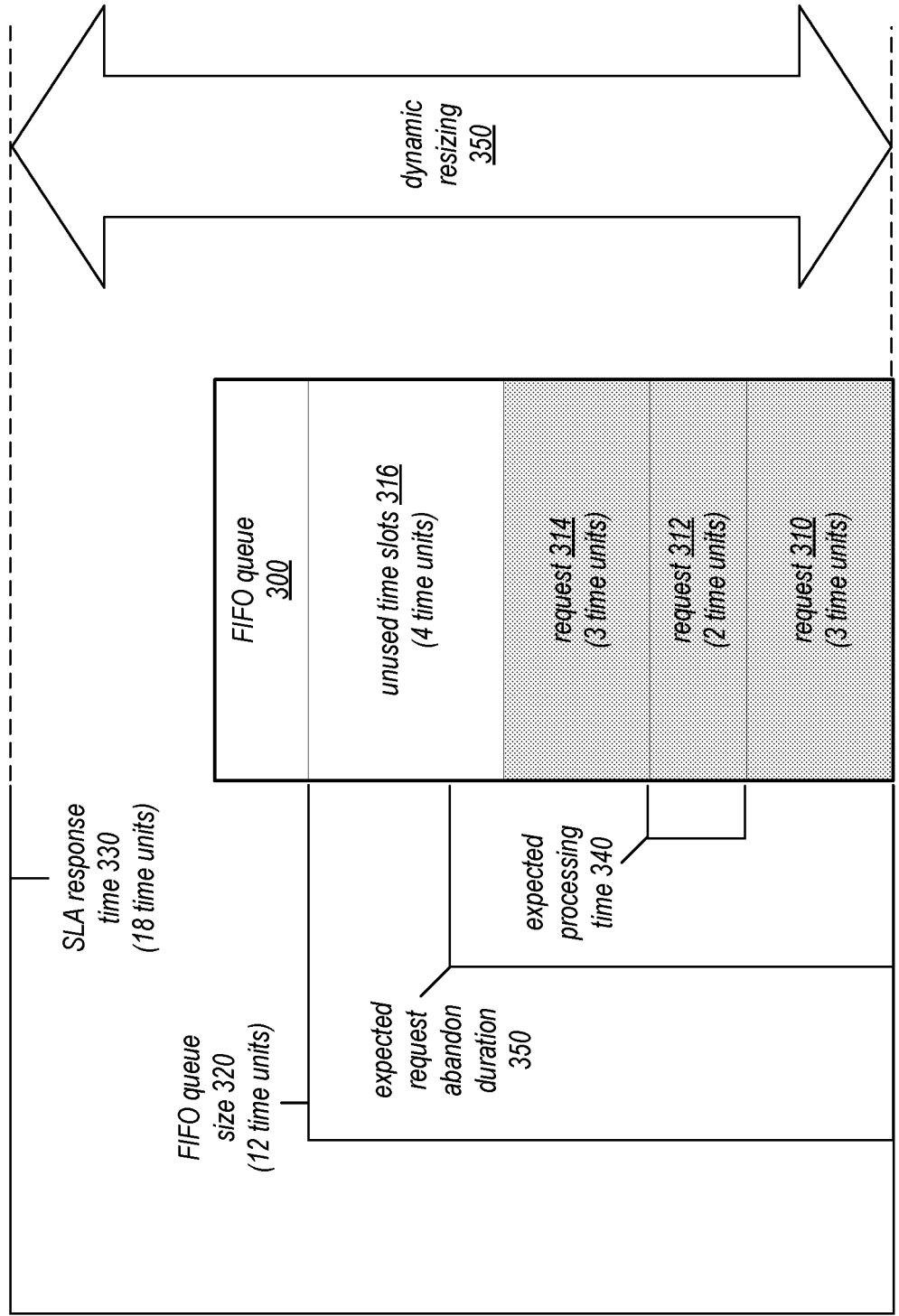
FIG. 3 illustrates an exemplary FIFO queue that is used in a hybrid queuing system to store and throttle requests to a service provider, according to some embodiments.

FIG. 3 illustrates an exemplary FIFO queue that is used in a hybrid queuing system to store and throttle requests to a service provider, according to some embodiments. In particular, FIG. 3 illustrates a FIFO queue 300, along with a number of illustrative timing parameters that may be used in determining the size of the FIFO queue 300.

As shown, the FIFO queue 300 has a current FIFO queue size 320, which is set to 12 time units. The units in this example may be any type of time units, for example milliseconds. The figure is not necessarily drawn to scale. As shown, FIFO queue 300 currently has three requests 310, 312, and 314 occupying the queue, taking up a total of 8 time units, thus leaving 4 unused time units 316.

In some embodiments, for example as shown in the figure, the FIFO queue size 320 may be specified in time units, and each request may have associated an expected processing time 340 for the request. For example, request 312 may have an expected processing time of 2 units. Thus, the fullness of the FIFO queue 300 is determined by comparing the time units that are allotted to the queue, and the sum of expected processing times 340 of the requests currently residing in the queue. The expected processing time 340 may be determined in a variety of ways. In some embodiments, such times may be readily determined a priori, and may be even specified in the SLA. For example, the SLA may specify that a first type of request is expected to be processed within 4.5 milliseconds, and a second type of request is expected to be processed within 6.5 milliseconds. In some other embodiments, the expected processing times 340 may be determined empirically by the system, by analyzing the arrival time of types of requests and the respective response times. In some embodiments, the expected processing times 340 may be configurable by a user or administrator of the system.

In some embodiments, the FIFO queue size 320 may be set to a fraction of an SLA response time 330, which may be a response time requirement or estimate set forth in the SLA. Such terms of the SLA may be provided to the system as a configuration parameter. In the illustrated example, the FIFO queue size 320 is set to 12 time units, and the SLA response time 330 is 18 time units. Thus, the FIFO queue size 320 is set to ⅔ of the SLA response time 330. In some embodiments, this fractional setting represents the point at which the overflow queue steps in to implement more sophisticated prioritization strategies for newly arriving requests, and potentially to throttle some of the newly arriving requests. Thus, such a division of requests allows the system to adaptively throttle requests when the load state of the system creeps over some threshold, represented by the fraction. The fraction controls when overflow and reprioritization in the overflow queue may begin relative to the SLA time requirement, and it may be configurable based on the preferences of the administrator. In some embodiments, the fraction may be less than 1, while in some other embodiments, the fraction may be greater than 1.

In some embodiments, the size of the FIFO queue 320 may be changed after the FIFO queue is created. This adjustment may be performed manually by an administrator, or dynamically by the system. The adjustments may take into account the changing conditions of the system or measurements taken by the system. In some embodiments, the adjustment may be based on the expected processing time 340, which is remeasured from time to time. Thus, for example, in some embodiments, the sizing function of the FIFO queue 300 may take into account the expected processing time 340 of the different types of requests. The system may occasionally monitor the actual processing time of these requests during operation, to determine an average, minimum, and/or maximum processing time for some sample of requests, for example during a most recent 5-minute window. It may be determined that under recent conditions, that requests 312 is expected to require 4 time units to process, instead of the 2 time units shown in the figure. Based on this finding, the system may adjust the size 320 of the FIFO queue.

In some embodiments, the adjustment in size may be based on an expected request abandon duration 350. Like the request processing time, the expected request abandon duration 350 may be specified a priori, for example in the SLA, or determine empirically, for example by determining the range of times that a TCP client closes a TCP connection before a response is returned to the client. For example, empirical observations by the system may determine that for some sample of requests, 90% of the responses generated after 9 time units will encounter a TCP connection that has been reset. The system may use this result to determine that the de facto abandon duration for the requests is currently 9 time units. In some embodiments, the expected request abandon duration 350 may be used as a parameter to determining the FIFO queue size 320. For example, a system may decide that requests that have likely been abandoned should be exposed to the potential throttling of the overflow queue, and thus set the FIFO queue size 320 at 100% of the expected request abandon duration. In some embodiments, the setting may be more or less than 100%, depending on the specific nature of the service system and performance considerations involved.

As shown, in some embodiments, the FIFO queue 300 may be resized dynamically 350, which may be performed by, for example, the queue sizing module 180 of FIG. 1. In some embodiments, such a module may monitor the timing metrics of the requests and responses of the system periodically, to determine or compute the metrics needed to determine the optimal size of the FIFO queue 300. Based on the results of the computation, the FIFO queue 320 may be resized. The resizing may occur relatively infrequently, for example on a weekly or monthly basis. In some embodiments, that parameters that control the dynamic resizing of the FIFO queue 300 may be specified by an administrator, for example via the configuration control interface 185 discussed in connection with FIG. 1.

Figure 4:
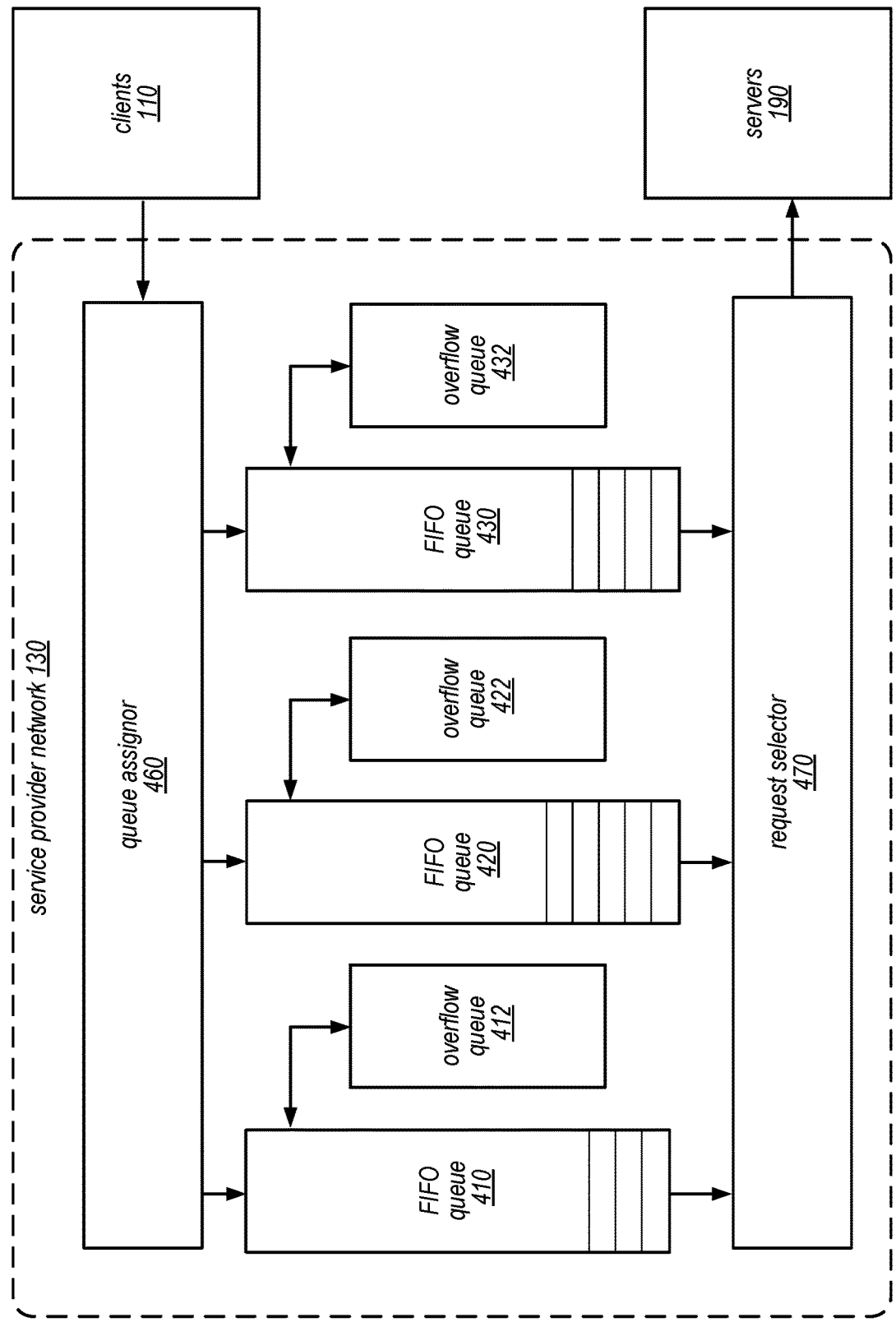
FIG. 4 illustrates and exemplary hybrid queueing system that employs a plurality of parallel subqueues, according to some embodiments.

FIG. 4 illustrates and exemplary hybrid queuing system that employs a plurality of parallel subqueues, according to some embodiments. As shown, in some embodiments, a hybrid queuing system may be implemented using a plurality of subqueues, each being a hybrid queue having a FIFO queue and an overflow queue. In some embodiments, when requests are received from clients 110, they are assigned to one of the subqueues by a queue assignor 460. For example, the assignment may be based on and identity of the client, or one or more attributes associated with the request. In some embodiments, requests may be de associated with and prioritized according to different classes of users. For example, in some embodiments, requests that are generated by a machine or robot may be assigned to one subqueue, and requests that are initiated from live human interactions may be assigned to another subqueue. In some embodiments, the subqueues may be associated with different classes of service quality levels of the service provider.

In some embodiments, the request may be extracted for processing from the plurality of subqueues using a request selector 470. In some embodiments, the request selector may implement a policy where requests from one subqueue is completely exhausted before any requests from a second subqueue is processed. Such a policy may mean that, for example, all human requests are serviced before any robot or machine generated requests. In some embodiments, the request selector 470 may select requests from one subqueue some percentage of the time, and requests from another subqueue another percentage of the time. Such a scheme may be used to implement a preference for one type of request over another, while avoiding complete starvation of any type of requests. In some embodiments, the request selector may be configured to prefer a certain subqueue based on a variety of conditions, such as the relative backlog of each subqueue, the available server, conditions of the service provider network, among other factors.

In some embodiments, the system may implement different policies for each of the overflow queues 412, 422, and 432. The system may be configured with a preference to throttle requests from some subqueues. For example, the queueing system may implement a throttling policy where 50% of the throttled requests come from overflow queue 412, 30% from overflow queue 422, and 20% from overflow queue 432. In some embodiments, a throttle selector may implement an algorithm that throttles the bottom request from each of the overflow queues in round robin fashion. In some embodiments, the system may treat the subqueues differently. For example, a throttle selector may only throttle from overflow queue 412 when it overflows, while overflow queues 422 and 432 may experience aggressive periodic throttling based on other detected conditions. As can be appreciated, the uses of parallel queues in this fashion allows the system additional flexibility to implement different policies to prioritize requests during an overloaded condition.

FIGS. 5A-5C are block diagrams illustrating example implementations of hybrid queuing systems to store and throttle requests, according to some embodiments. FIG. 5A illustrates a system where requests 510 are first received by a load balancer 512. Depending on the implementation, the load balancer 512 may be a server, a node, a virtual machine instance running on a host, etc. However, in some embodiments, the load balancer may reside on the same physical machine as the servers. The load balancer 512 may distribute received requests among a plurality of servers 514, 516, and 518, based on a load balancing policy. In some embodiments, the load balancer 512 may be one load balancer node in a fleet of load balancer nodes configured to initially handle client requests. In this example, each of the servers 514, 516, and 518 may implement a FIFO queue to store requests assigned to that particular server to be processed. These FIFO queues may be sized based on the SLA and the capabilities of the servers, for example. Moreover, the load balancer 512 may implement an overflow queue, which stores requests that none of the servers can accept. In some embodiments, the load balancer 512 may place a request on the overflow queue when a first chosen server does not accept a request, so that the request may be promoted to another server according to the algorithm of a promotion module. In some embodiments, the load balancer 512 may implement a global overflow queue for the entire system, and begin to throttle the requests in the overflow queue when the overflow queue reaches a certain critical state.

FIG. 5B illustrates another system where requests 520 are received by multiple servers 522 and 524. In this embodiment, as with the previous example, the individual servers 522 and 524 maintain their own FIFO queues. However, in this embodiment, the individual servers may forward overflowing requests to a shared throttler 526, which may implement the overflow queue. In some embodiments, the shared throttler 526 may be a separate node or nodes that is responsible for managing the global throttling of requests in the system. In some embodiments, as congestion in the servers eases, the shared throttler 526 may promote some requests back to the servers' FIFO queues. The promotion may occur as either a push by the shared throttler 526 or a pull by the respective servers, depending on the embodiment.

In some embodiments where a global overflow request is used, the overflow queue may prioritize the requests more intelligently by grouping the requests according to their context. For example, the overflow queue may recognize that a particular group of requests all belong to a single top-level request or top-level client session, such that throttling or delaying one request in the group will effectively throttle or delay the entire group. This determination may be made, for example, by examining a session ID or client IP address associated with the requests. Accordingly, in some embodiments, the overflow queue may prioritize all requests in such a group the same, so that they are all promoted at the same time or throttled at the same time. When some request in the group is still in the FIFO queue or is promoted to the FIFO queue, the other requests in the group may be reprioritized to higher rankings in the overflow queue. Conversely, when some request in the group is throttled, the overflow queue may deprioritize or even throttle the other requests in the group.

FIG. 5C illustrates yet another system where requests 530 are first received into a FIFO queue 532. As shown, the FIFO queue 532 is paired with an overflow queue 536 so that requests overflowing from the FIFO queue 532 are placed in the overflow queue 536. As shown, requests in the FIFO queue 532 may be provided directly into a service processing system 534, which may be a server, node, virtual machine instance, etc. in the system, that is tasked with processing a request as normal. However, the priority of requests placed on the overflow queue 536 may be refined by a priority refinement unit 538. For example, in some embodiments, the priority of the requests on the overflow queue may be refined based on some limited amount of preprocessing, such as determining the nature and/or complexity of the request, etc. In some embodiments, the priority refinement may place the request in a different form from when they are received. For example, in a database system, incoming queries may need to be pre-processed to parse and validate the query string. Such pre-processing work may be performed relatively quickly by the priority refinement unit 538. On the other hand, the more time-consuming work of actually fetching queried data from the database is left to the servers 534. In some embodiments, the pre-processing itself may generate needed information to prioritize the request in the overflow queue 536. For example, in the database example, the priority refinement unit 538 may examine a query to determine how time-consuming the query will be. The overflow queue may then prioritize fast queries ahead of slow queries, based on the results of the priority refinement.

FIG. 6 illustrates an example user interface that can be used to configure a hybrid queuing system to store and throttle requests, according to some embodiments. The user interface 600 may be part of a graphical user interface (GUI) to configure an ad-hoc service, such as a web-based service. In some embodiments, service providers may implement a general-purpose queuing service in the cloud, for example as a "software as a service" (SaaS). Such queuing services may be used for a variety of applications (e.g., message queues). User interface 600 may thus be a configuration interface for such a queuing service. Although FIG. 6 depicts one way of using a GUI to configure the hybrid queuing system, a person of ordinary skill would understand that there are numerous other ways of configuring the behavior of computer systems. For example, in some embodiments, configuration may be performed via one or more configuration files, such as XML, files. In some embodiments, configuration may be performed programmatically from a client using call interface or API. All such types of configuration interfaces are contemplated within the scope of the inventions disclosed herein.

As shown, the user interface 600 includes two sections: a primary queue depth section 610, and an overflow queue section 620. In some embodiments, the overflow queue 620 may be optional. In some embodiments, if the user does not provide any configuration for the overflow queue, the service may simply throttle any request that overflows the primary (FIFO) queue, or implement a default overflow queue to implement throttling.

As shown, the primary of FIFO queue may be sized in a number of ways. One way is to simply specify the number of requests that the FIFO should accommodate. Another way is to specify the FIFO queue size based on the SLA, which may specify a response time requirement, an expected response time, or some quality of service (QoS) term. Such information may be provided as configuration data to the service, and used to compute a queue size during user configuration. For example, in the figure, the system may automatically fill in queue size value (here corresponding to a response time of 80 milliseconds), based on some fraction of the SLA response time (here 80%).

Yet another way to specify the FIFO queue size is to dynamically determine the queue size 615 based on a certain set of runtime measurable metrics. These metrics may be used in conjunction with the terms of the SLA, or used in place the SLA, to determine the size of the FIFO queue. For example, in some embodiments, the system may be configured to periodically measure the expected request processing time and/or expected request abandon duration for requests in a particular time window (e.g., most recent 5 minutes). The observed metrics may be used to compute the expected times (e.g., based on an average, minimum, or maximum of observed values), which are then used to periodically adjust the size of the FIFO queue.

As shown, if the user selects to enable the overflow queue at section 620, the user may then specify a number of configuration settings for the overflow queue. For example, the user may specify how the requests are sorted in the overflow queue, by for example indicating a sort order. In the illustrated user interface, the user may click the ADD MORE button 622 to add sort attributes to create a prioritization function for the overflow queue. This prioritization function may be used by the overflow queue to determine the prioritization order, which may be used to promote and/or throttle requests. Further, in some examples, the user interface may allow the user to specify a throttle criteria. In the illustrated user interface, the user may click the ADD MORE button 624 to add attributes to create a throttle condition. For example, as shown, a throttle may occur when the overflow queue is full. In addition, a throttle may occur periodically to remove all requests in the queue with an age greater than 10 milliseconds. As discussed, when a system is overload, its requests queues tend to be filled with old request that are either abandoned or superseded by later requests. The existence of such requests contributes to the death spiral of the system during a congestion collapse.

Figure 7:
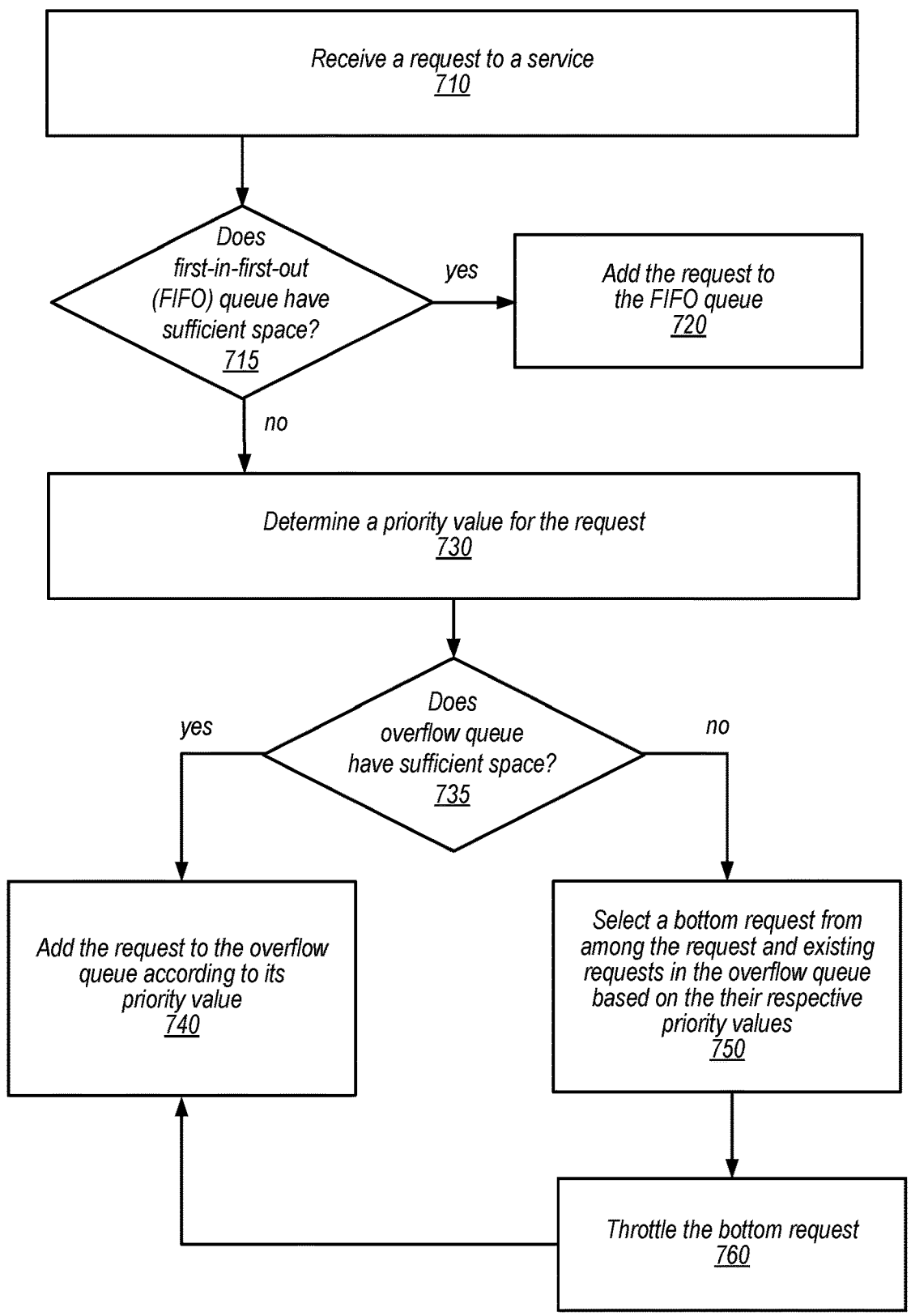
FIG. 7 is a flowchart illustrating exemplary operations of a computer system that stores requests in a hybrid queuing system, according to some embodiments.

FIG. 7 is a flowchart illustrating exemplary operations of a computer system that stores requests in a hybrid queuing system, according to some embodiments. At operation 710, a request is received by a service. The service may be any type of service provided by a service provider network or system, for example service provider network 130 as discussed in connection with FIG. 1. The service may initially receive the request via a public web server, a gateway, a load balancer, a dispatcher, etc., which may make an initial decision to schedule the request for processing.

At operation 715, a determination is made whether sufficient space exists on a FIFO queue to store the request. The determination may be performed by for example a request scheduler 150 of FIG. 1, by the FIFO queue itself, or by one or more servers as discussed in connection with FIGS. 5A-5C. As discussed, the FIFO queue may be sized to hold some number of requests such that under normal conditions, the service queues incoming requests in FIFO order. The size may be based on a response time requirement or specification in an SLA for the service, such that the FIFO queue will be able to hold some number of requests that accounts for a fraction of the SLA response time requirement. In some embodiments, the size of the FIFO queue may be based on other factors, such as an expected abandon duration of future requests. In some embodiments, the FIFO queue size may adjust dynamically based on changing system conditions, changing operation metrics, or the load condition of the system.

If there is sufficient space on the FIFO queue, at operation 720, the request is added to the FIFO queue to be processed. However, if there is not sufficient space, at operation 730, a priority value is determined for the request. The priority value allows the request to be added to a second overflow queue, such as the overflow queue 145 or various other overflow queues discussed in connection with the figures. In some embodiments, operation 730 may be performed by a prioritization module 148, as discussed in connection with FIG. 1. As discussed, the priority value may be determined based on a variety of prioritization schemes, which may be configurable or dynamically adaptable. In some embodiments, the priority value may be based on a receipt or arrival time of the request. In some embodiments, the priority value may be based on an expected processing time of the request. In some embodiments, the request may below to a group of requests that may be promoted or throttled together, and the request's priority value may depend on the priority value of other requests in the group. In some embodiments, the request's priority value may be based on a pseudorandom value.

In some embodiments, the priority value of the request may be determined based on whether the request was human-initiated or machine-initiated. In such embodiments, the system may implement an additional step to determine the nature of the request based on a robot detection technique. As may be appreciated by those skill in the art, a variety of robot detection techniques may be used. For example, in some embodiments, robots may be instructed to voluntarily identify themselves by specifying directives in a robot.txt file. In some embodiments, the service provider may implement a CAPTCHA test to separate human-initiated requests from robot-initiated requests. In some embodiments, a server may embed client-side code in its contents, so as to detect human activity on the client. The results of these techniques may be used to classify each request as human-initiated or machine-initiated, so that the request can be prioritized accordingly.

At operation 735, a determination is made whether sufficient space exists on the overflow queue to store the request. If so, at operation 740, the request is added to the overflow queue according to its priority value. The fate of the request in the overflow queue then depends on how quickly the service is able to return to a stable condition. The overflow queue may implement a promotion process whereby requests are promoted back to the FIFO as processing is performed on the FIFO queues. At the same time, the overflow queue may implement a throttling process whereby requests are throttled. Thus, depending on the policy of the system and the system's ability to recover from the overload condition, the request will eventually be processed or throttled.

If the overflow does not have sufficient space for the request, at operation 750, the overflow queue may select a bottom request from among the request and other existing requests on the overflow queue, according to their respective priority values. The selected bottom request may then be throttled at operation 760. Thus, in some cases the incoming request may be the bottom request selected by the operation, and that request may be immediately dropped. In other cases, the incoming request may cause another request on the overflow queue to be pushed off the queue. In that case, the incoming request is added to the overflow queue per operation 740. In some embodiments, the new request is first added into the overflow priority queue, and then, if the queue is overflowing, the bottom request may be throttled. In other embodiments, a bottom request is first discarded, and then, if the new request is not discarded, it is added to the queue.

The throttling operation 760 may be implemented different on different systems. In some embodiments, the throttling may generate a message to the client for the request, indicating that the request will not be serviced due to the current load of the service, and possibly indicating to try the request at a later time.

Figure 8B:
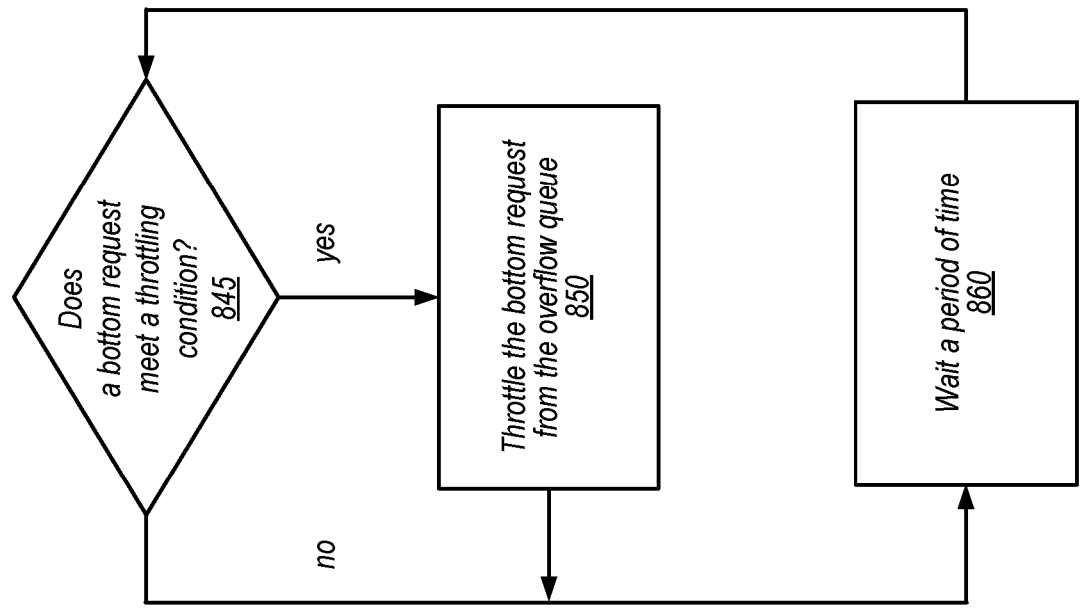
FIGS. 8A and 8B are flowcharts illustrating exemplary operations of an overflow queue that promotes and throttles requests in a hybrid queuing system, according to some embodiments.
Figure 8A:
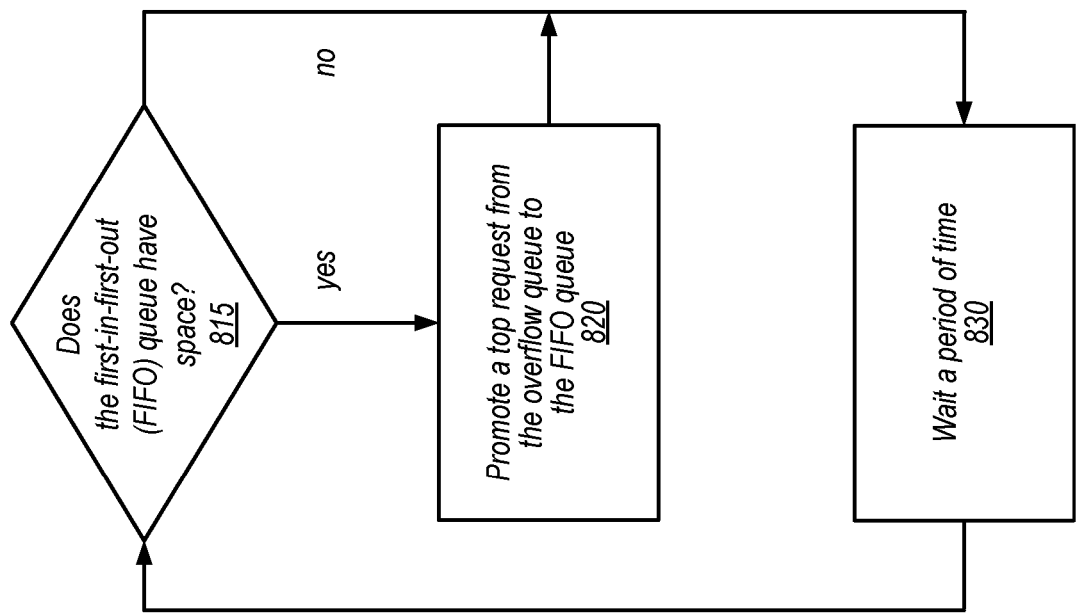

FIGS. 8A and 8B are flowcharts illustrating exemplary operations of an overflow queue that promotes and throttles requests in a hybrid queuing system, according to some embodiments. In some embodiments, the processes depicted in FIGS. 8A and 8B may be performed by the overflow queue, for example the overflow queue 145 discussed in connection with FIG. 1. In some embodiments, the overflow queue may call upon other components, such as the promotion module 160 or throttling module 170, to perform some of the operations in the figure.

At operation 815, a determination is made whether the FIFO queue has space. Space may become available in the FIFO queue as requests in the FIFO queue are removed due to processing. In some embodiments, the overflow queue or a promotion module may observe or register to listen for events from the FIFO queue, so that the overflow queue may quickly detect when space becomes available on the FIFO queue.

If space is available on the FIFO queue, at operation 820, a top request may be promoted from the overflow queue to the FIFO queue. The top request may be selected based at least in part on the priority order of the overflow queue. If not, the process may proceed to operation 830. It should be noted that while the figure is depicted such that the determination 815 may occur in a periodic polling process, in some embodiments, the determinations may occur asynchronously from the operations of the overflow queue. For example, in some embodiments determination 815 may be triggered by an external event generated from the FIFO queue or the arrival of a new request. In some embodiments, such external events may trigger action from the overflow queue immediately.

At operation 830, the system simply waits a period of time, before repeating the determination cycle over again. Thus, in the illustrated example, the process operates in a loop, repeatedly checking for promotion conditions. However, as discussed, in some embodiments, the process may not be implemented in a loop. Rather, the promotion may be triggered based on external events, for example, the state of the FIFO queue. In some embodiments, the wait period may be variable. For example, in some cases where there are more servers consuming requests from the FIFO queue, or where the system is severely overloaded, the promotion process may check for space in the FIFO queue more frequently.

At operation 845, a determination is made whether a bottom request meets a throttling condition. In some embodiments, the overflow queue or a throttling module may monitor the bottom request(s), so that the overflow queue may quickly detect when the bottom request(s) are ready to be throttled. The throttling may occur on a periodic basis, or immediately upon the detection of requests meeting the throttling condition. The bottom request may be determined based at least in part on the priority order of the overflow queue. As discussed, the throttling condition may be based on a variety of factors, such as the age of the request, the expected processing time of the request, and the priority of other related requests in the queues.

If a bottom request is found to meet the throttling condition, at operation 850, the bottom request is throttled. Operation 850 may be performed in similar fashion to operation 760, as discussed in connection with FIG. 7. If no bottom request is found meeting the throttling condition, the process may proceed to operation 860.

At operation 860, the system simply waits a period of time, before repeating the determination cycle over again. Thus, in the illustrated example, the process operates in a loop, repeatedly checking for throttling conditions. However, as discussed, in some embodiments, the process may not be implemented in a loop. Rather, the throttle may be triggered based on external events. For example, in some embodiments, a throttle may occur due to the overflow of the overflow queue. As another example, a throttle may occur as the result of an external command to throttle some percentage of the pending requests. In some embodiments, the throttling may not occur at all until some level of usage is reached in the overflow queue. In some embodiments, the wait period may be variable. For example, in some cases where the overflow queue is nearing its capacity, or where the system is severely overloaded, the throttling process may check for throttling conditions in the overflow queue more frequently.

Figure 9:
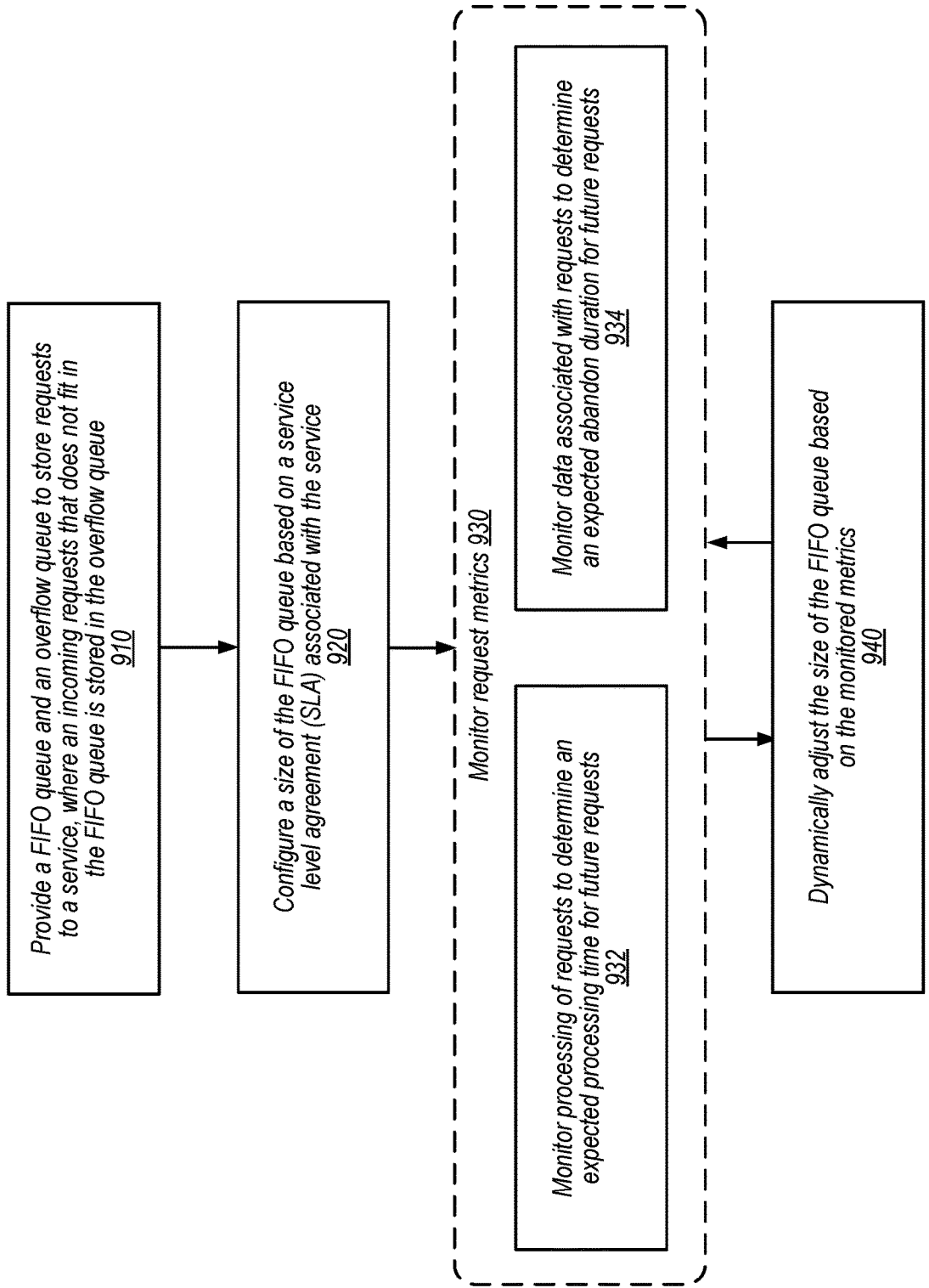
FIG. 9 is a flowchart illustrating exemplary operations of a computer system that dynamically adjusts the size of a FIFO queue in a hybrid queuing system, according to some embodiments.

FIG. 9 is a flowchart illustrating exemplary operations of a computer system that dynamically adjusts the size of a FIFO queue in a hybrid queuing system, according to some embodiments. In some embodiments, the process may be performed queue sizing module 180 of FIG. 1, and based on one or more conditions discussed in connection with FIG. 3.

At operation 910, a FIFO queue and an overflow are provided to store requests to a service. The two queues may be for example FIFO queue 140 and overflow queue 145 discussed in connection with FIG. 1. As discussed, as request come into the service, they are initially stored and service from the FIFO queue, in FIFO order. However, when a large number of requests are pending, the FIFO queue may overflow into the overflow queue, so that additional incoming requests are stored in the overflow queue.

At operation 920, the size of the FIFO queue is configured based on one or more terms in an SLA associated with the service. Operation 920 may be performed, for example, when the FIFO queue is first created. Operation 920 may also be performed after the initial creation of the FIFO queue, for example in a later adjustment by an administrator, prompted possibly by the change to SLA. As discussed, the FIFO queue may be sized so that it can accommodate a number of requests that correspond to a fraction of a maximum response time specified in the SLA. The response time may in some cases be a requirement, or in some cases an estimation. In some cases, the response time may be specified for different classes of traffic that define QoS classes for the service. In some embodiments, such terms from the SLA may be input into the service as part of the configuration for the service.

At operation 930, request metrics are monitored. Thus, as requests are processed by the system, various metrics are collected and computed based on the actual performance of the service and actual behavior of the service's clients. The metrics may then be used to adjust the size of the FIFO queue, from time to time. In some embodiments, the monitoring may occur periodically, for example one 5-minute window every day, during a typical time of the day. This monitoring may be based on observations of requests within a sampling window, and may be performed periodically. The computed metrics may be based on an average, a maximum, or a minimum of the observed data, or based on some other formula.

For example, at operation 932, the processing of requests are monitored to determine an expected processing time for future requests. For example, the servers in the system may track the start and end times of the processing of some number of requests. At operation 934, data associated with requests are monitored to determine an expected abandon duration for future requests. For example, servers in the system may track how often a client's TCP connection is reset before the response is fully processed, and record how long it took for the TCP connection to reset. As another example, the system may track how often stream resets are detected within HTTP/2 connections, and the duration of time it took for these resets to occur. In some cases, the system may determine how quickly a request is superseded by a retry request, by for example associating a request with the retry request. Such data may be collected to determine an expected abandon duration for future requests.

At operation 940, the size of the FIFO queue is dynamically adjusted based on the monitored metrics, such as the expected processing time or the expected abandon duration. Operations 930 and 940 may operate in a loop that continuously monitors the metrics of the queueing system and adjusts the size of the FIFO queue accordingly. In some embodiments, the adjustment may be made based on a policy or a set of rules specified by an administrator. For example, an administrator may specify that the FIFO queue should be kept to above 80% of an SLA response time, and below 110% of an expected abandon duration, based on the periodically adjusted expected processing times. In some embodiments, the FIFO queue may adjust periodically, for example once per week during an off-peak period of the service. In some embodiments, if a reduction in the FIFO queue causes a request to be pushed from the FIFO queue, a demotion process may occur to place the displaced request onto the overflow queue, according to the priority ordering of the overflow queue.

Figure 10:
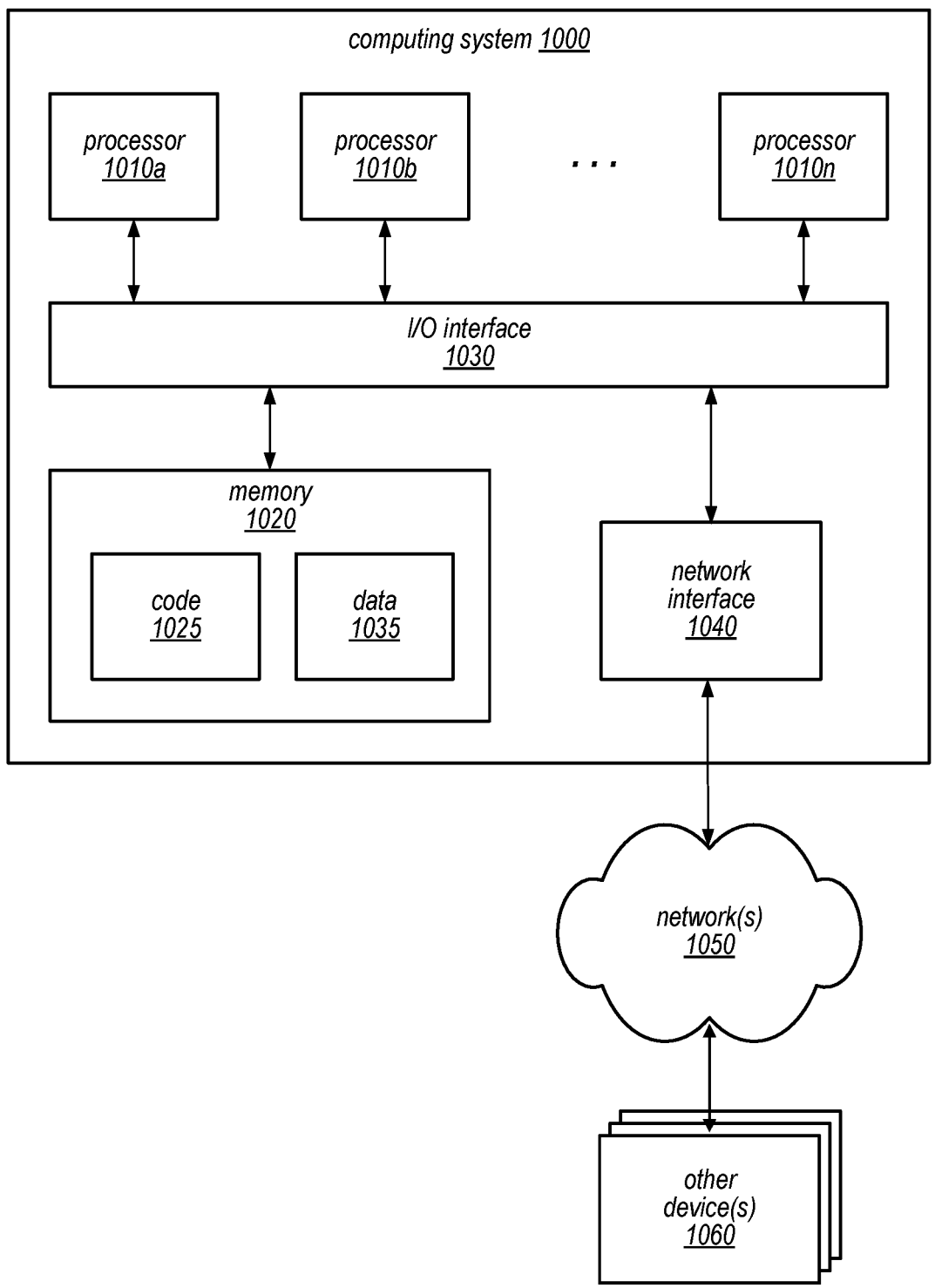
FIG. 10 is a block diagram illustrating an example computer system that can be used to implement one or more portions of a computer system that implements a hybrid queuing system for requests, according to some embodiments.

FIG. 10 is a block diagram illustrating an example computer system that can be used to implement one or more portions of a computer system that employs a request-specific nonce, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI)

bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 920, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 7, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more processors with associated memory, configured to implement a hybrid queue system comprising at least two different queues that store respective requests in two different priority orders, including:
   a first-in-first-out (FIFO) queue configured to store requests to a computer-implemented service in FIFO order; and
   an overflow queue configured to store requests in a priority order other than FIFO order;
   wherein the hybrid queue system is configured to:
   store incoming requests in the FIFO queue when the FIFO queue is not full, and in the overflow queue when the FIFO queue is full;
   promote a top request from the overflow queue to the FIFO queue when space becomes available on the FIFO queue, wherein the top request is determined based at least in part on the priority order of the overflow queue; and
   throttle a bottom request from the overflow queue, wherein the bottom request is determined based at least in part on the priority order of the overflow queue.

2. The system of claim 1, wherein the FIFO queue is sized based at least in part on an expected number of requests to be processed within a time period, wherein the time period is a response time requirement specified in a service level agreement (SLA) associated with the computer-implemented service.

3. The system of claim 1, wherein the hybrid queue system is configured to dynamically adjust a size of the FIFO queue based on at least in part on one of an expected processing time for future requests or an expected abandon duration for future requests.

4. The system of claim 1, wherein the hybrid queue system is configured to throttle one or more requests from the overflow queue when the overflow queue is full.

5. The system of claim 1, wherein the hybrid queue system is configured to throttle one or more requests from the overflow queue periodically, based on a throttling policy.

6. A computer-implemented method, comprising:
   receiving a first request at a hybrid queue system comprising at least two different queues that store respective requests in two different priority orders, wherein the hybrid queue system stores and throttles requests to a service;

determining that a first-in-first-out (FIFO) queue of the hybrid queue system has sufficient space for the first request, and in response adding the first request to the FIFO queue;

receiving a second request to the service at the hybrid queue system;

determining that the FIFO queue does not have sufficient space for the second request, and in response adding the second request to an overflow queue of the hybrid queue system that stores requests in a priority order of the overflow queue other than FIFO order, wherein the adding of the second request comprises:

determining a priority value for the second request; and adding the second request to the overflow queue based on its priority value and the priority order of the overflow queue;

determining that the FIFO queue has sufficient space based on an event, and in response:

selecting a top request from the overflow queue based on the priority order of the overflow queue; and promoting the top request from the overflow queue to the FIFO queue; and in response to an overloaded condition, throttling one or more requests from the overflow queue based on the priority order of the overflow queue.

7. The method of claim 6, wherein the determination that the FIFO queue does have sufficient spaces is made in response to removing an earlier request from the FIFO queue.

8. The method of claim 6, further comprising:

receiving a third request to the service at the hybrid queue system;

determining another priority value for the third request;

in response to a determination that the overflow queue does not have sufficient space for the third request:

selecting a bottom request from among the third request and existing requests in the overflow queue based on the other priority value of the third request and respective priority values of the existing requests; and throttling the bottom request.

9. The method of claim 6, further comprising:

determining that a subset of requests on the overflow queue satisfy a throttling condition based at least in part on the respective priority values of the subset of requests and a throttling policy; and throttling the subset of requests from the overflow queue.

10. The method of claim 6, wherein the determination of a priority value for the second request is based at least in part on an arrival time of the second request at the computer-implemented service.

11. The method of claim 10, wherein the priority order of the overflow queue is a last-in-first-out (LIFO) order.

12. The method of claim 6, wherein the determination of a priority value for the second request is based at least in part on an expected processing time of the second request.

13. The method of claim 6, further comprising:

determining whether the second request is initiated by a robot using a robot detection technique; and wherein the determination of the priority value for the second request is based at least in part on the determination of whether the second request is initiated by a robot.

14. The method of claim 6, wherein the determination of a priority value for the second request is based at least in part on a pseudorandom value.

15. A non-transitory computer-accessible storage medium storing program instructions that when executed on one or more processors cause the one or more processors to:

receive a first request at a hybrid queue system comprising at least two different queues that store respective requests in two different priority orders, wherein the hybrid queue system stores and throttles requests to a service;

determine that a first-in-first-out (FIFO) queue of the hybrid queue system has sufficient space for the first request, and in response add the first request to the FIFO queue;

receive a second request to the service at the hybrid queue system;

determine that the FIFO queue does not have sufficient space for the second request, and in response add the second request to an overflow queue of the hybrid queue system that stores requests in a priority order other than FIFO order, wherein to add of the second request, the program instructions when executed on the one or more processors cause the one or more processors to:

determine a priority value for the second request;

add the second request to the overflow queue based on its priority value and the priority order of the overflow queue;

determine that the FIFO queue has sufficient space based on an event, and in response:

select a top request from the overflow queue based on the priority order of the overflow queue;

promote the top request from the overflow queue to the FIFO queue; and in response to an overloaded condition, throttle one or more requests from the overflow queue based on the priority order of the overflow queue.

16. The non-transitory computer-accessible storage medium of claim 15, wherein the program instructions when executed on the one or more processors cause the one or more processors to:

configure a size of the FIFO queue based at least in part on a response time requirement specified in a service level agreement (SLA) associated with the service.

17. The non-transitory computer-accessible storage medium of claim 16, wherein to configured the size of the FIFO queue, the program instructions when executed on the one or more processors cause the one or more processors to:

configure the size of the FIFO queue to accommodate an expected number of requests to be processed within a fraction of the response time requirement, the fraction being less than 1.

18. The non-transitory computer-accessible storage medium of claim 15, wherein the program instructions when executed on the one or more processors cause the one or more processors to:

monitor incoming requests to determine an expected processing time for future requests; and dynamically adjust a size of the FIFO queue based at least in part on the expected processing time.

19. The non-transitory computer-accessible storage medium of claim 15, wherein the program instructions when executed on the one or more processors cause the one or more processors to:

monitor data associated with the incoming requests to determine an expected abandon duration for future requests; and dynamically adjust a size of the FIFO queue based at least in part on the expected abandon duration.

20. The non-transitory computer-accessible storage medium of claim 19, wherein to monitor data associated with the incoming requests to determine an expected abandon duration for future requests, the program instructions when executed on the one or more processors cause the one or more processors to:

determine that a client connection associated with an incoming request was reset; and determine an abandon duration for the incoming request based on when the client connect was reset.

\* \* \* \* \*